(12) United States Patent
Capps

(10) Patent No.: US 6,326,947 B1
(45) Date of Patent: Dec. 4, 2001

(54) TACTILE CHARACTER INPUT IN COMPUTER-BASED DEVICES

(75) Inventor: Stephen P. Capps, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/260,924

(22) Filed: Mar. 2, 1999

(51) Int. Cl.$^7$ ........................................ G09G 5/00
(52) U.S. Cl. .................... 345/156; 345/33; 345/173; 340/815.44
(58) Field of Search .................. 345/173–183, 345/156–169, 33; 178/18.01–18.11, 19.01–19.07; 341/21–23; 348/734; 340/815.4, 815.44

(56) References Cited

U.S. PATENT DOCUMENTS

| | | | |
|---|---|---|---|
| 4,078,257 | * | 3/1978 | Bagley ................................ 708/145 |
| 4,199,751 | * | 4/1980 | Piguet .................................. 341/22 |
| 4,727,357 | * | 2/1988 | Curtin et al. ......................... 341/22 |
| 4,737,980 | * | 4/1988 | Curtin et al. ..................... 379/93.18 |
| 5,521,986 | * | 5/1996 | Curtin, II et al. .................. 382/187 |
| 5,646,649 | * | 7/1997 | Iwata et al. ......................... 345/173 |
| 5,670,955 | * | 9/1997 | Thorne, III et al. .................. 341/34 |
| 6,029,214 | * | 2/2000 | Dorfman et al. ..................... 710/73 |
| 6,107,997 | * | 8/2000 | Ure ..................................... 345/173 |

* cited by examiner

Primary Examiner—Lun-Yi Lao
(74) Attorney, Agent, or Firm—Lee & Hayes, PLLC

(57) ABSTRACT

A character entry device in accordance with the invention has a character entry surface. The character entry surface has raised character segment guides upon which characters can be traced by a human user. Sensors are associated with the segment guides to indicate when particular segment guides are traced. Decoding logic is responsive to the sensors to detect actually traced segment sequences and to determine characters that correspond to the actually traced segment sequences. In one embodiment, the character entry surface and segment guides are part of a remote control. An additional key face pivots to either cover or expose the segment guides. When the key face is covering the segment guides, keys in the key face rest against the segment guides and can be depressed to depress the segment guides. Decoding logic in the remote control interprets segment guide depressions as individual keystrokes when the key face is in this position.

40 Claims, 6 Drawing Sheets

TACTILE CHARACTER INPUT IN COMPUTER-BASED DEVICES

TECHNICAL FIELD

This invention relates to devices and methods for entering symbols and characters using a device such as a wireless remote control that has only a limited number of keys.

BACKGROUND OF THE INVENTION

There are many computer-like devices that have no keyboards or only limited keypads, but still require text entry. One example of such a device is a so-called "Internet TV" device that enables a user to browse the World Wide Web of the Internet using a television and a simple infrared (IR) remote control. Another ii example is a video game device. Both of these devices are used in conjunction with CRT's or other two-dimensional graphical displays, while neither device has a full alphanumeric keyboard.

Typically, control buttons available to the user are limited to directional control keys and some variation of an "action" key. The directional control keys are used to move a cursor or focus to various locations on a display, and the action key is used to select an action corresponding to the cursor or focus location. Typically, these keys are used to enter numbers and text.

FIG. 1 illustrates one method of on-screen text entry that utilizes a "spin dial" 10. A spin dial has a small box 11 containing a symbol that can be changed by the user. Up and down arrows 12 and 13 are displayed on the top and bottom of the box. The user can position a cursor over the up and down arrows and press an action key to change the displayed symbol. For instance, pressing the action key when the cursor is positioned over the up arrow changes the displayed symbol to the next in a sequence of symbols—from A to B, for example. Similarly, pressing the action key when the cursor is positioned over the down arrow changes the displayed symbol to the preceding symbol in the sequence.

FIG. 2 illustrates another method of text entry, utilizing a "virtual keyboard" 15. The virtual keyboard is actually an on-screen representation of a conventional QWERTY keyboard such as implemented in typewriters and computer keyboards. To select a particular character, the user moves the cursor to that character and presses the action key. A "done" key indicates the end of text entry.

Although these prior art methods are workable, they are awkward and burdensome. Each method requires significant concentration on the part of the user, and a significant number of key depressions in order to enter even very simple text strings. Compared to handwriting and typing, with which most users are comfortable, these prior art methods are quite difficult.

Handwriting recognition has been used in some contexts to reduce or eliminate reliance on bulky keyboards. In the past, however, handwriting recognition has been a difficult proposition, requiring very complex software and correspondingly expensive hardware.

To reduce the complexity normally required of handwriting recognition systems, many devices such as the Graffiti recognition system, part of the PalmPilot™ organizer sold by Palm Computing, Inc, a subsidiary of 3COM Corp., require users to learn new character symbols that are somewhat artificial. These character symbols are designed to reduce the ambiguity and variability associated with normal handwriting, and to thus reduce the amount of analysis required to process written characters. Even with these measures, significant processing is required to convert highly variable user pen strokes to alphanumeric characters.

The invention described below allows a user to enter characters by tracing them with a fingertip. In contrast to many prior art handwriting recognition systems, traced character decoding is very simple. Furthermore, users are not constrained to unnatural character or symbol shapes when tracing characters. The invention is particularly adaptable for use with a wireless remote control, in which processing capacity is normally very limited. The invention allows tracing on a smaller device, and permits operation without requiring the user to look at the device. This is especially beneficial in a living-room setting where television-based devices are used.

SUMMARY OF THE INVENTION

The invention includes a character entry surface with a plurality of raised, tactile character segment guides. The segment guides are preferably elongated segments arranged along the common lines of alphabetic and numeric characters. A figure "8" is an example of such an arrangement.

The guides are implemented as simple rectangular keys in one embodiment, with associated sensors. Decoding logic detects sequences of keystrokes generated when a user traces characters over the keys while pressing them. The decoding logic compares each sequence with a list of predefined sequences to determine a character corresponding to the sequence.

An infrared remote control that includes a character entry surface such as this also has a pivotable key face that pivots into a position over the segment guides. The key face has additional keys on its surface that can be pressed to depress the underlying segment guides. In this case, segment guide depressions are interpreted as keystrokes rather than traced characters.

DETAILED DESCRIPTION

Figure 1:
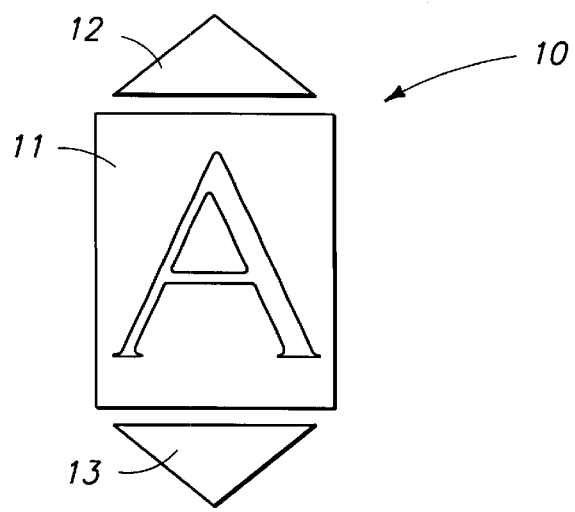
FIG. 1 shows a prior art spin dial.
Figure 2:
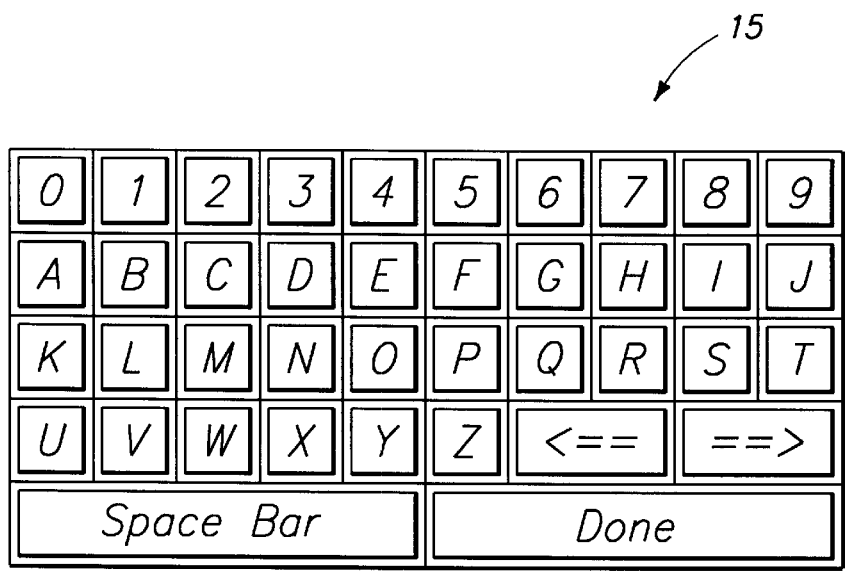
FIG. 2 shows a virtual keyboard as used in the prior art.
Figure 3:
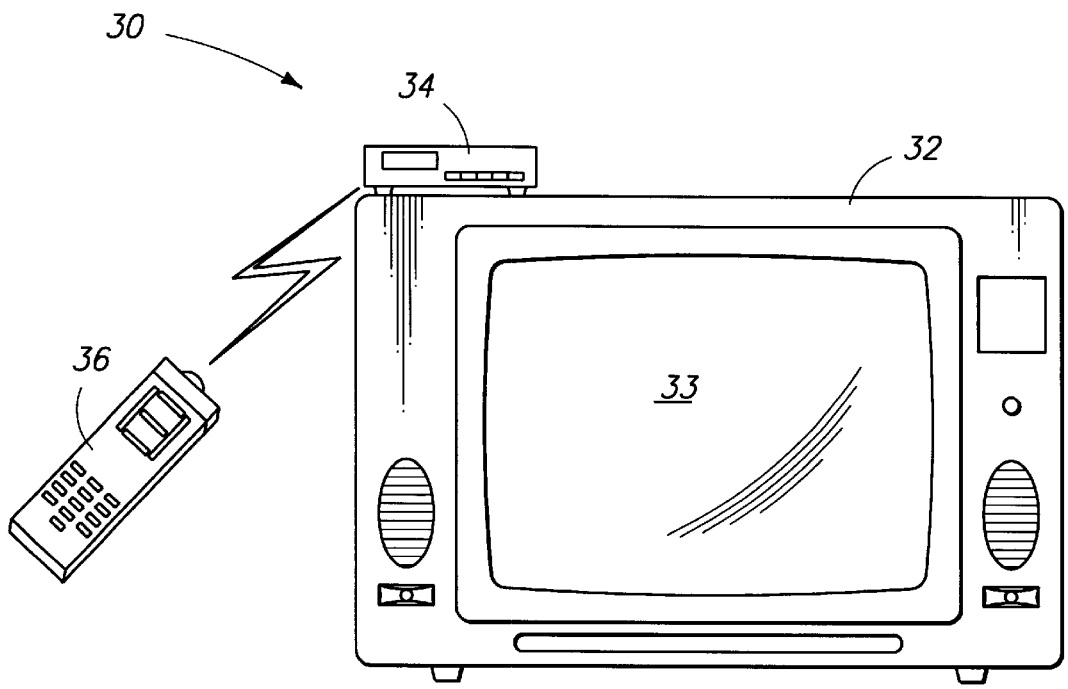
FIG. 3 illustrates a computer-based video and network browsing system in accordance with an embodiment of the invention.

FIG. 3 shows a computer-based video and network browsing system in accordance with one embodiment of the invention, generally designated by reference numeral 30. System 30 includes a CRT or other display unit 32 having a graphical display surface 33, and an associated control unit 34. A remote, handheld command unit such as an infrared (IR) wireless remote control 36 is configured to send signals to control unit 34 in response to a user pressing buttons or keys.

In the described embodiment of the invention, display unit 32 is a color television receiver. Control unit 34 is one of a number of different microprocessor-based units that provides video to display unit 32. For example, control unit 34 might be a set-top box that receives cable or satellite television broadcasts. As another example, control unit 34 might be a video game unit. Alternatively, control unit 34 might be a minimally-configured computer or network interface component that is connected to the Internet (by a modem, for example). Such a component has browser software for allowing a user to access, view, and "browse" the Internet's World Wide Web and its multimedia resources in conjunction with display unit 32 and wireless remote control 36. As a still further alternative, the capacity for receiving both television content and Internet content might be integrated in an enhanced television.

Figure 4:
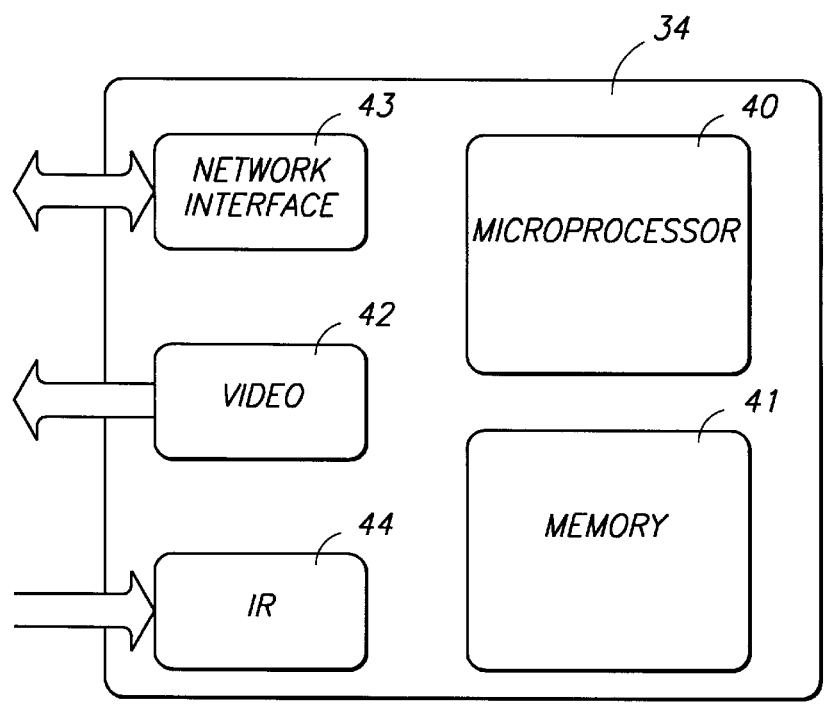
FIG. 4 shows control unit components in block diagram form.

FIG. 4 shows basic components of an exemplary control unit 34. The control unit includes a microprocessor 40 and associated memory 41. Programs and data are stored in memory 41, to be accessed and executed by microprocessor 40. Memory 41 comprises conventional electronic memory such as ROM, RAM, PROM, EPROM, EEPROM, and the like. Memory 41 might also include magnetic or optical-based memory such as floppy disks, hard disks, CD-ROMs, etc. The methodological steps described below are potentially performed by instructions that are stored on some such type of computer-readable memory or media and executed by microprocessor 40. When the control unit is embodied for Internet use, an HTML display program executes from the memory to display specified network resources on display device 32 in response to character-based specifications such as Web-based URLs (Uniform Resource Locators) and other commands provided by a human user via remote control 36.

In addition to microprocessor 40 and memory 41, control unit 34 includes various interface components. In this case, such interface components include a video subsystem 42 that can be instructed or programmed by microprocessor 40 to present characters and graphics on display surface 33.

The interface components also include a network interface 43 such as an analog television receiver or tuner, or a digital receiver such used to receive digital television broadcasts from satellite sources. The network interface might also (or alternatively) include a computer network interface such as a modem or Ethernet interface to a local-area or wide-area data communications network such as the s Internet. In some embodiments of the invention, an Internet downlink might be provided from a digital satellite, while an Internet uplink is provided by modem. Other types of network connections are likely to become widespread in the future.

Control unit 34 also includes an infrared (IR) receiver 44 for receiving commands and keystrokes from remote control 36.

Figure 5:
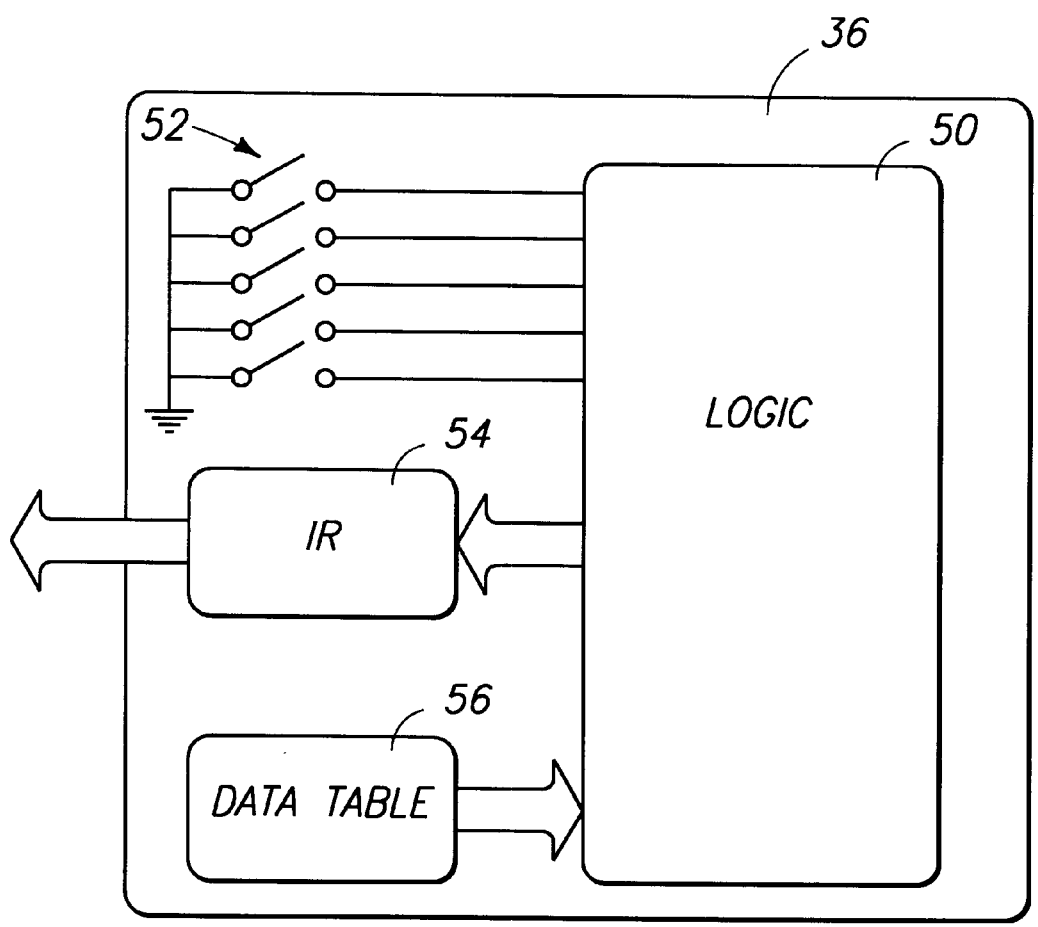
FIG. 5 shows remote control components in block diagram form.

FIG. 5 shows basic components of an exemplary remote control 36 in accordance with the invention. The remote control includes decoding logic 50 that is configured to receive and decode a plurality of switch inputs 52. Each switch corresponds to a key or button provided on the face of the remote control. The remote control includes an IR transmitter 54 for transmitting keystrokes, characters, and/or commands to control unit 34. A data or lookup table 56 is optionally associated with decoding logic 50 for reference when decoding sequences of switch inputs. In many embodiments, the logic and data table will be implemented as an inexpensive microprocessor and associated electronic memory, respectively.

In the described embodiment of the invention, wireless remote control 36 functions as a character entry device. The remote control has a plurality of tactile character segment guides, arranged so that a user can trace alphabetic or numeric characters along the guides. In one embodiment of the invention, the guides are actually raised keys associated with switches 52. Tracing a character results in a sequence of key depressions and a corresponding sequence of switch inputs to decoding logic 50. Decoding logic 50, in conjunction with data table 56, decodes switch sequences and transmits corresponding characters or character codes through IR transmitter 54 to control unit 34.

When decoding logic 50 is a microprocessor, its associated memory includes instructions that are executable by the microprocessor for performing the steps described below relating to decoding sequences of switch inputs. In other embodiments, the decoding logic might be relatively simple, designed to merely relay individual keystrokes or switch closures to control unit 34. In this case, control unit 34 is programmed or otherwise configured to decode sequences of keystrokes representing traced characters.

Figure 6:
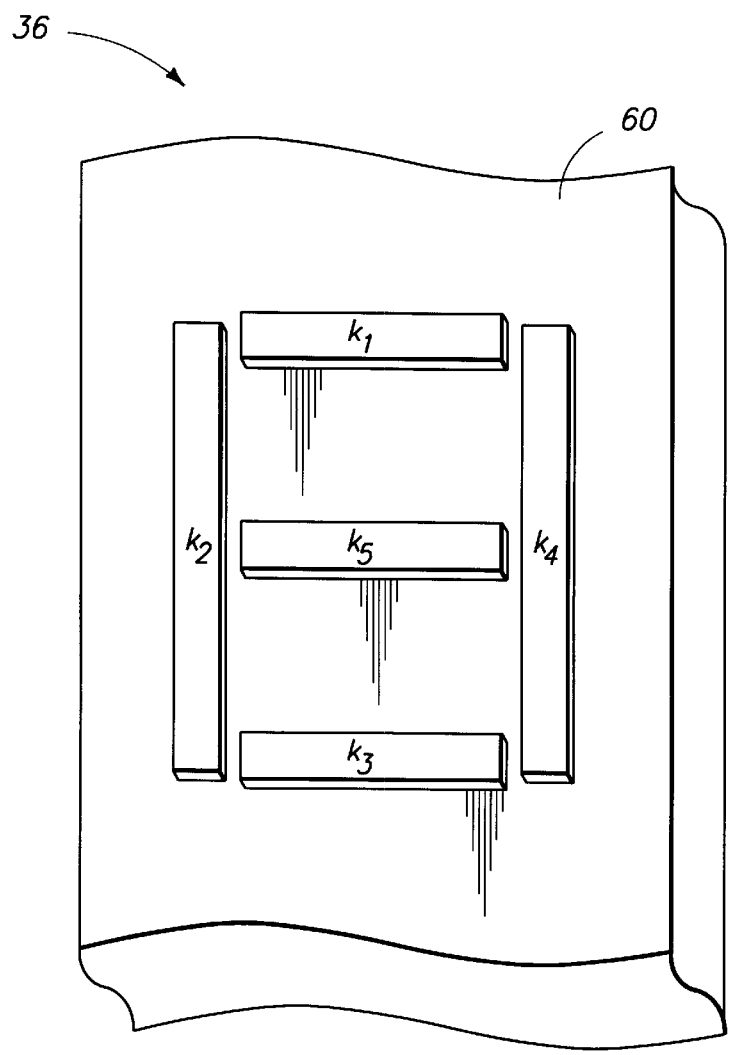
FIG. 6 shows a first exemplary segment guide layout.

FIG. 6 shows a portion of the top surface 60 of remote control 36, referred to herein as a character entry surface. Character entry surface 60 has a plurality of keys or buttons $k_1$ through $k_5$ that are configured as tactile character segment guides. That is, the keys are arranged along the segments of characters that a user might potentially trace on the remote control. The keys are tactile in the sense that a user can feel them—they are raised from top surface 60 or otherwise delineated so that a user can easily trace along the keys without looking at them.

In the example shown, the five keys are arranged in the approximate outline of a figure "8", similarly to a traditional seven-segment LED display. This allows a human user to trace numerals over the keys. Switches 52 (FIG. 5) or other types of sensors are associated with the keys so that logic 50 can detect a key sequence as the user depresses the keys while tracing a numeral over them.

Tracing any particular numeral results in a specific sequence of segments or keys. For example, tracing the numeral "5" results the key sequence $k_1$ $k_2$, $k_5$, $k_4$, $k_3$—in that specific order. The numeral "8" uses three of the available keys more than once to produce the sequence $k_1$, $k_2$, $k_5$, $k_4$, $k_3$, $k_2$, $k_5$, $k_4$. The numeral "1" has more than one possible sequence: the single key $k_2$ or the single key $k_4$. The numeral "6" also has more then one legitimate key sequence: $k_2$, $k_3$, $k_4$, $k_5$ and $k_1$, $k_2$, $k_3$, $k_4$, $k_5$.

Decoding logic 50 is responsive to the keys and their sensors to detect actually traced segment sequences, and to determine characters and/or character codes that correspond to the actually traced segment sequences. In order to decode different sequences, the decoding logic is responsive to entries stored in data table 56. These entries indicate a plurality of possible segment sequences and corresponding characters in a lookup table format. Table 1 below is an example of a lookup table for decoding numerals "0" through "9" in conjunction with the is tactile guide layout of FIG. 6.

TABLE 1

| Traced Segment Sequence | Numeral |
|---|---|
| $k_1$, $k_2$, $k_3$, $k_4$ | "0" |
| $k_2$, $k_3$, $k_4$, $k_1$ | "0" |
| $k_2$ | "1" |
| $k_4$ | "1" |
| $k_1$, $k_4$, $k_5$, $k_2$, $k_3$ | "2" |

TABLE 1-continued

| Traced Segment Sequence | Numeral |
|---|---|
| $k_1, k_4, k_5, k_4, k_3$ | "3" |
| $k_2, k_5, k_4$ | "4" |
| $k_1, k_2, k_5, k_4, k_3$ | "5" |
| $k_1, k_2, k_3, k_4, k_5$ | "6" |
| $k_2, k_3, k_4, k_5$ | "6" |
| $k1, k4$ | "7" |
| $k_1, k_2, k_5, k_4, k_3, k_2, k_5, k_4$ | "8" |
| $k_1, k_2, k_5, k_4$ | "9" |

As mentioned above, the remote control does not have to be the component that detects actually traced segment sequences and that determines corresponding characters. Logic for decoding key sequences can alternatively be implemented in control unit 34, using microprocessor 40 and its associated memory 41. In this case, remote control 36 would transmit individual codes for corresponding keystrokes or segment depressions.

Figure 7:
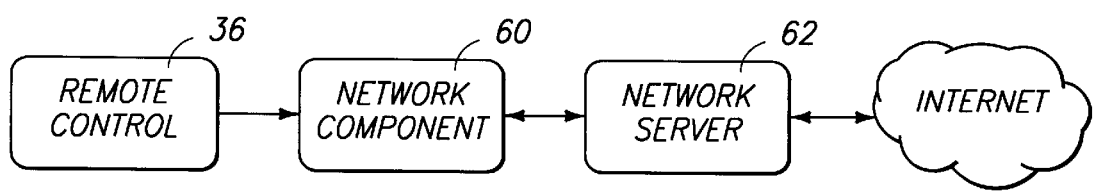
FIG. 7 shows an alternative video and network browsing system configuration.

FIG. 7 shows another possible distribution of decoding logic. In this configuration, remote control 36 transmits sequences of actually traced individual keystrokes to a network access component 60. The network access component is connected to a network server 62, which is in turn connected to a network such as the Internet. Rather than interpreting the sequences itself, the network access component 60 transmits the segment sequences to server 62, which decodes the keystroke sequences and provides the resulting decoded characters back to network access component 60.

When using the described character entry scheme, there should be some way to delineate characters—to tell when one character ends and the next one starts. One way to do this is to measure the times between key depressions. Any time gap of over a specified amount (such as a half a second, for example) indicates that tracing of the current character has been completed. Another method is to provide other keys for this purpose, such as an "action" key or cursor control keys.

The tactile guides and associated sensors can be of a variety of configurations. For example, the guides can be actual depressible keys such as used on conventional computer keyboards, and the sensors can be actual key switches such as electro mechanical contact switches or other switches commonly used in conjunction with computer keyboards. Alternatively, patterned or embossed tracing guides can be provided on a molded membrane overlying an array or matrix of pressure sensitive sensors. Such sensors might be pressure resistive membrane switches, capacitive switches, or other types of sensors.

The switches are preferably discrete, and associated individually with respective keys or guides. However, the switches might be part of an X-Y array of switches or sensors, such as an X-Y resistive touch panel. Raised, tactile guides might also be formed over a touch-sensitive display surface, so that a user can enter characters on a surface that is also used for text or graphics display.

Visual feedback might be provided as an aid to entering characters. For example, control unit 34 might draw characters or character segments on display surface 33 as the characters are being entered. In addition, character strings are preferably displayed as they are being entered by the user. An action key, separate from the tactile guides described above, is provided to signal when a character string has been completed.

A variety of different guide layouts are possible. However, any selected layout should include segment guides that allow intuitive tracing of the complete character set in use. At a minimum, most layouts will include a plurality of approximately vertical segment guides spaced horizontally from each other, and a plurality of approximately horizontal segment guides spaced vertically from each other. The example of FIG. 6, for example, includes three horizontal segment guides and two vertical segment guides, forming an approximate figure "8". Such an arrangement is useful primarily for numerals.

A more versatile configuration includes at least three approximately vertical segment guides spaced horizontally from each other, at least three approximately horizontal segment guides spaced vertically from each other, and a plurality of diagonal sensor guides extending between intersections of the vertical and horizontal segment guides.

Figure 8:
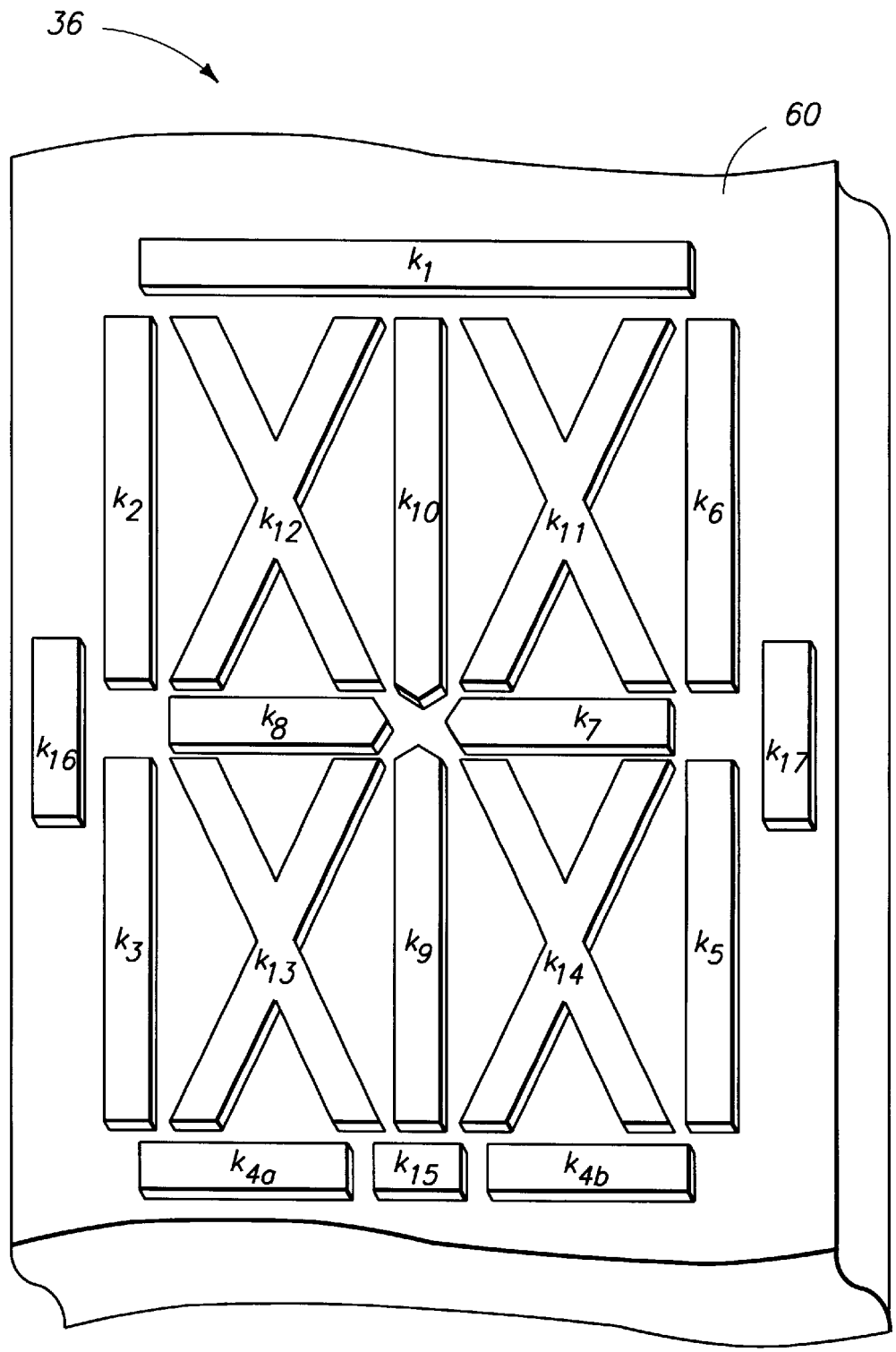
FIG. 8 shows a second exemplary segment guide layout.

FIG. 8 shows an arrangement similar to this. This arrangement includes at least three vertically elongated guides and at least three horizontally elongated guides arranged to outline one or more parallelograms. Specifically, the segment guides are arranged to form four open squares. In this example, the three vertical guides are segmented into upper and lower portions: the left vertical guide includes guide portions $k_2$ and $k_3$; the middle vertical guide includes portions $k_{10}$ and $k_9$; and the right vertical guide includes portions $k_6$ and $k_5$. Each portion is associated with a different sensor, although this might not always be the case.

Two of the horizontal guides are similarly segmented. The lower segment guide actually comprises three keys: $k_{4a}$, $k_{15}$, and $k_{4b}$. However, $k_{4a}$ and $k_{4b}$ are associated with a single sensor or switch; pressing either of these keys results in an identical switch activation. In most cases, however, each sensor will be associated with only a single segment guide.

The central horizontal guide is segmented into portions $k_7$ and $k_8$, each with its own corresponding sensor.

X-shaped segment guides $k_{11}$, $k_{12}$, $k_{13}$, and $k_{14}$ are positioned within the open squares. Each X-shaped segment guide provides two diagonals. However, only a single switch input is associated with each X-shaped segment guide.

Key $k_{15}$ is actually a tactile button that is used to enter "period" symbol. This symbol is frequently required in Internet and other network addresses.

Two more tactile buttons are provided in this example, to aid in text entry. A right button $k_{17}$ is used as an "enter" or "action" button, to signal completion of a single character. This button might also be used to indicate completion of a text string (such as by pressing the button twice without intervening character tracing). A left button $k_{16}$ is used as a backspace key. Alternatively, this button can be used for focus control-to move an on-screen focus to a particular character entry point.

Figure 9:
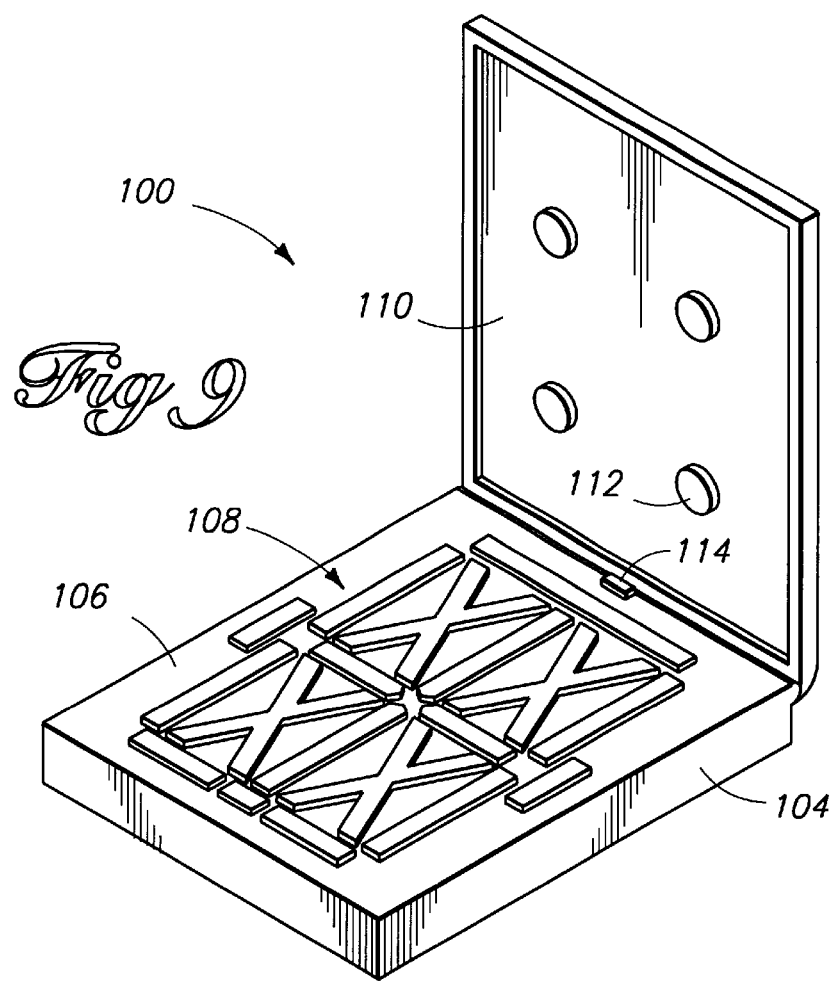
FIGS. 9 and 10 show a remote control in accordance with one embodiment of the invention.
Figure 10:
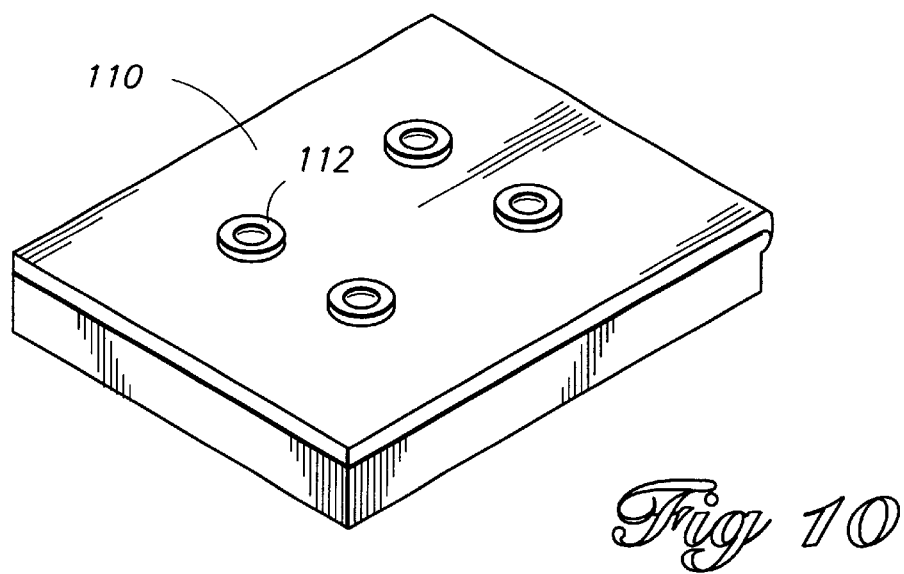

FIGS. 9 and 10 show a further embodiment of a remote control in accordance with the invention, referenced by numeral 100. Remote control 100 has electrical components similar or identical to those shown in FIG. 5. Externally, remote control 100 comprises a body 104 within which its electrical components are housed. It has a character entry surface 106 upon which tactile character segment guides 108 are positioned as described above. In addition, it has a key face 110 that is pivotable or otherwise movable between a raised position, shown in FIG. 9, in which the segment guides are exposed, and a lowered position, shown in FIG. 8, in which the key face overlies and obscures the segment guides.

A plurality of keys or buttons 112 are positioned on the key face. The keys are labeled like conventional remote control buttons. For example, the keys might include "up" and "down" keys for channel selection and/or for focus or cursor control. To use these buttons, the key face 110 is lowered over the segment guides. The key face is pivoted upward to expose the segment guides for character tracing.

Keys 112 are mounted so that they slide up and down through key face 110. They extend through the key face and rest against the tactile guides when the key face is lowered. The keys are positioned laterally so that each key 112 is positioned over a respective tactile guide to activate the corresponding guide and its underlying sensor when the key is pressed. A further sensor or switch 114 is positioned to be activated when the key face is lowered over the character entry surface. The sensor indicates to decoding logic 50 when the key face is overlying the character entry surface.

Decoding logic 50 is configured to interpret switch activations differently when the key face is overlying the character entry surface. Specifically, the decoding logic treats switch closures as attempts to trace characters when the key face is up. When the key face is down, however, the decoding logic interprets switch closures as simple command keys. In use, the key face will be left down much of the time, and keys 112 will be used as normal remote control keys. Control device 34, or whatever other component receives input from the remote control, is thus responsive to keystrokes rather than to traced characters when the key face is overlying the segment guides. When text entry is required, however, the user will lift the key face and trace characters along the exposed segment guides 108.

Although the invention has been described primarily in terms of its electrical, physical, and operational characteristics, the invention also includes a method of entering characters into a computer-based device such as a network access component. Broadly, such a method includes a step of tracing characters over a plurality of tactile character segment guides. Example configurations of such segment guides are described above. Further steps comprise monitoring the segment guides with decoding logic to detect and generate sequences of actually-traced segments in response to the tracing. A further step comprises comparing the actually traced segment sequences to a plurality of predefined segment sequences to determine characters corresponding to the segment sequences.

A significant advantage of the invention is that the tactile guides remove much of the ambiguity from handwritten text entry, without requiring a user to learn a new symbolic text entry language. The guides constrain the user to defined paths, and greatly reduce the complexity of the mathematical input generated by drawing a character. This in turn reduces the complexity of the decoding logic.

In situations where ambiguities remain, they can be reduced by using additional logic. For example, traced segment sequences can be disambiguated by using a list of allowed character strings. This tends to narrow the choices for any particular character. Similarly, grammatical rules can be used for disambiguation; if grammatical rules indicate the next word should be an adverb, then a list of common adverbs could be used to disambiguate choices. Given the "grammar" of URL's, one might assume that ".com" or ".edu" or ".net" are common suffixes that appear after a period so the process could concentrate on the letters c, e, or n after a period.

A further advantage of the invention is that only relatively simple input hardware is used. Relatively few key switches or sensors are required to allow a user to trace characters, as compared to conventional handwriting recognition systems that require expensive X-Y tablets.

In summary, the invention provides a very simple yet very intuitive way for a user to enter characters into a computer-based device.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A character entry device comprising:
   tactile character segment guides upon which characters can be traced by a human user;
   sensors associated with the segment guides to indicate when particular segment guides are traced; and
   decoding logic that compares ordered sequences of actually traced segments to a plurality of predefined ordered segment sequences to determine characters corresponding to the actually traced ordered segment sequences, at least some of the predefined ordered segment sequences including three or more segments.

2. A character entry device as recited in claim 1, wherein the segment guides are raised.

3. A character entry device as recited in claim 1, wherein the sensors are pressure sensitive.

4. A character entry device as recited in claim 1, wherein each sensor is associated with only a single segment guide.

5. A character entry device as recited in claim 1, wherein the sensors form a sensor matrix underlying the segment guides.

6. A character entry device as recited in claim 1, wherein the segment guides include:
   a plurality of approximately vertical segment guides spaced horizontally from each other;
   a plurality of approximately horizontal segment guides spaced vertically from each other.

7. A character entry device as recited in claim 1, wherein the segment guides include,
   at least three approximately vertical segment guides spaced horizontally from each other;
   at least three approximately horizontal segment guides spaced vertically from each other;
   a plurality of diagonal sensor guides extending between intersections of the vertical and horizontal segment guides.

8. A character entry device comprising:
   tactile character segment guides upon which characters can be traced by a human user;
   sensors associated with the segment guides to indicate when particular segment guides are traced;
   wherein the segment guides include:
   at least three approximately vertical segment guides spaced horizontally from each other;
   at least three approximately horizontal segment guides spaced vertically from each other;
   the vertical and horizontal segment guides being arranged to outline one or more parallelograms;
   a plurality of X-shaped segment guides positioned within the parallelograms.

9. A character entry device as recited in claim 8, wherein the segment guides include:
   four X-shaped segment guides positioned within the parallelograms.

10. A character entry device as recited in claim 8, further comprising:

a data table that indicates a plurality of possible ordered segment sequences and corresponding characters.

11. A character entry device as recited in claim 1, wherein the segment guides include:
   two vertical segment guides spaced horizontally from each other;
   three horizontal segment guides spaced vertically from each other;
   the vertical and horizontal segment guides being arranged to form an approximate figure eight.

12. A character entry device as recited in claim 1, wherein the segment guides include at least one segment corresponding to a period.

13. A character entry device as recited in claim 1, further comprising a tactile button that indicates the completed tracing of a single character.

14. A character entry device as recited in claim 1, further comprising one or more tactile focus control buttons.

15. A character entry device as recited in claim 1, further comprising:
   a key face that is movable into a position overlying the segment guides;
   a plurality of keys on the key face, the keys being positioned over the segment guides when the key face overlies the segment guides to activate the sensors when the keys are pressed.

16. A character entry device as recited in claim 15, wherein the key face pivots to expose the segment guides for character tracing.

17. A character entry device as recited in claim 15, comprising a further sensor that indicates when the key race is overlying the segment guides.

18. A wireless remote control comprising:
   a character entry surface;
   the character entry surface having tactile character segment guides upon which characters can be traced by a human user;
   sensors associated with the segment guides to indicate when particular segment guides are traced;
   a key face that is movable into a position overlying the character entry surface;
   a plurality of keys on the key face, the keys being positioned over the segment guides when the key face overlies the character entry surface to activate the sensors when the keys are pressed; and
   decoding logic that is responsive to the sensors to detect actually traced segment sequences and to determine characters that correspond to the actually traced segment sequences.

19. A wireless remote control as recited in claim 18, wherein the segment guides are raised.

20. A wireless remote control as recited in claim 18, further comprising:
   a data table that indicates a plurality of possible segment sequences and corresponding characters;
   the decoding logic being responsive to the table to determine characters that correspond to the actually traced segment sequences.

21. A wireless remote control as recited in claim 18, wherein the key face pivots to expose the character entry surface for character tracing.

22. A wireless remote control as recited in claim 18, comprising a further sensor that indicates when the key face is overlying the character entry surface.

23. A network browsing system that browses network resources in conjunction with a display device, comprising:
   a network component configured to display specified network resources on the display device in response to character-based specifications provided by a human user;
   a wireless remote control having tactile character segment guides upon which characters can be traced by a human user;
   the network component being responsive to characters traced on the segment guides to browse network resources specified by such traced characters;
   the network component having decoding logic that is responsive to actually traced segment sequences to determine characters that correspond to the actually traced segment sequences.

24. A network browsing system as recited in claim 23, wherein the network component is further configured to send actually traced segment sequences to a network server.

25. A network browsing system as recited in claim 23, wherein the network component is further configured to send actually traced segment sequences to a network server and to receive decoded characters from the network server in response.

26. A network browsing system as recited in claim 23, the network component being configured to receive both television content and Internet content.

27. A network browsing system as recited in claim 23, the network component comprising an enhanced television configured to receive both television and network content.

28. A network browsing system as recited in claim 23, the network component comprising an enhanced television configured to receive both television and Internet content.

29. A network browsing system as recited in claim 23, further comprising:
   a key face that is movable into a position overlying the segment guides;
   a plurality of keys on the key face, the keys being positioned over the segment guides when the key face overlies the segment guides to activate the sensors when the keys are pressed;
   a further sensor that indicates when key face is overlying the segment guides;
   the network component being responsive to keystrokes rather than to traced characters when the key face is overlying the segment guides.

30. A computer-based device that requires character entry from a human user, comprising:
   a processor;
   a character entry surface;
   the character entry surface having tactile character segment guides upon which characters can be traced by a human user;
   sensors associated with the segment guides to indicate when particular segment guides are traced;
   the processor being responsive to the sensors to detect ordered sequences of actually traced segments;
   wherein the processor compares the detected ordered sequences of actually traced segments to a plurality of predefined ordered segment sequences to determine characters corresponding to the actually traced ordered segment sequences, at least some of the predefined ordered segment sequences including three or more segments.

31. A computer-based device as recited in claim 30, wherein the segment guides are raised.

32. A computer-based device as recited in claim 30, further comprising a graphics display device, the processor being configured to display characters traced by the human user on the graphics display device.

33. A computer-based device as recited in claim 30, further comprising:

a data table that indicates a plurality of possible ordered segment sequences and corresponding characters;

wherein the processor is responsive to the table to determine the characters that correspond to the ordered sequences of actually traced segments.

34. A computer-based device as recited in claim 30, further comprising:

a key face that is movable into a position overlying the character entry surface;

a plurality of keys on the key face, the keys being positioned over the segment guides when the key face overlies the character entry surface to activate the sensors when the keys are pressed.

35. A computer-based device as recited in claim 30, further comprising:

a key face that is movable into a position overlying the character entry surface;

a plurality of keys on the key face, the keys being positioned over the segment guides when the key face overlies the character entry surface to activate the sensors when the keys are pressed;

a further sensor that indicates when the key face is overlying the character entry surface.

36. A method of character entry, comprising:

tracing characters over a plurality of tactile character segment guides;

generating sequences of actually traced segments in response to said tracing;

comparing the actually traced segment sequences to a plurality of predefined segment sequences to determine characters corresponding to the actually traced segment sequences; and disambiguating actually traced segment sequences with a list of allowed character strings.

37. A method of character entry, comprising:

tracing characters over a plurality of tactile character segment guides;

generating sequences of actually traced segments in response to said tracing;

comparing the actually traced segment sequences to a plurality of predefined segment sequences to determine characters corresponding to the actually traced segment sequences; and disambiguating actually traced segment sequences with grammatical rules.

38. A computer-readable storage medium containing instructions for character entry, the instructions being executable to perform steps comprising:

monitoring a plurality of tactile character segment guides to detect ordered sequences of actually traced segments;

comparing the actually traced ordered segment sequences to a plurality of predefined ordered segment sequences to determine characters corresponding to the actually traced ordered segment sequences, at least some of the predefined ordered segment sequences including three or more segments.

39. A computer-readable storage medium as recited in claim 38, the instructions being executable to perform a further step comprising disambiguating actually traced segment sequences with a list of allowed character strings.

40. A computer-readable storage medium as recited in claim 38, the instructions being executable to perform a further step comprising disambiguating actually traced segment sequences with grammatical rules.

* * * * *

UNITED STATES PATENT AND TRADEMARK OFFICE
CERTIFICATE OF CORRECTION

PATENT NO. : 6,326,947 B1
DATED : December 4, 2001
INVENTOR(S) : Capps

It is certified that error appears in the above-identified patent and that said Letters Patent is hereby corrected as shown below:

<u>Column 3,</u>
Line 43, delete "s" after "the".

<u>Column 4,</u>
Line 56, delete "is" after "the".

<u>Column 9,</u>
Line 31, change "race" to -- face --.

Signed and Sealed this

Second Day of July, 2002

Attest:

*Attesting Officer*

JAMES E. ROGAN
*Director of the United States Patent and Trademark Office*